United States Patent [19]

Nonaka et al.

[11] Patent Number: 5,330,786
[45] Date of Patent: Jul. 19, 1994

[54] METHOD OF MANUFACTURING COLOR-COATED OPTICAL FIBERS

[75] Inventors: Tsuyoshi Nonaka; Nobuhiro Akasaka, both of Kanagawa, Japan

[73] Assignee: Sumitomo Electric Industries, Ltd., Osaka, Japan

[21] Appl. No.: 841,068

[22] Filed: Feb. 25, 1992

[30] Foreign Application Priority Data

Feb. 25, 1991 [JP] Japan ................. 3-029870

[51] Int. Cl.$^5$ ............................................. B05D 5/06
[52] U.S. Cl. .................................... 427/163; 427/513; 427/514; 427/165; 427/302; 427/377; 427/385.5; 427/407.2
[58] Field of Search ..................... 427/163, 385.5, 165, 427/407.2, 302, 513, 514

[56] References Cited

U.S. PATENT DOCUMENTS 4,474,830 10/1984 Taylor ................................ 427/163
4,575,437 3/1986 Kojima et al. ...................... 427/163

FOREIGN PATENT DOCUMENTS 9013579 11/1990 PCT Int'l Appl. .

OTHER PUBLICATIONS

Chemical Abstracts, vol. 109, No. 10, Sep. 1988, Columbus, Ohio, abstract No. 78494C, p. 323.
Chemical Abstracts, vol. 111, No. 6, Sep. 16, 1989, Columbus, Ohio, abstract No. 101823M, p. 289.
Chemical Abstracts, vol. 110, No. 2, Jan. 1989, Columbus, Ohio, abstract No. 12360v, p. 259.

Primary Examiner—Janyce Bell
Attorney, Agent, or Firm—Cushman, Darby & Cushman

[57] ABSTRACT

The present invention provides a method of manufacturing an optical fiber coating with a greater adhesive strength between the primary coating layer and the colored layer as the secondary coating layer. This method prevents the colored layer from being removed together with the bundle coating layer when the bundle coating layer is removed, for example, prior to joining. A colored layer is provided on the outer circumference of the primary coating layer while keeping the surface of the primary coating layer in an unhardened state to thereby improve the adhesive strength between the primary coating layer and the colored or secondary layer.

2 Claims, 1 Drawing Sheet

METHOD OF MANUFACTURING COLOR-COATED OPTICAL FIBERS

BACKGROUND OF THE INVENTION

1. Field of the Invention

The present invention relates to a coated optical fiber to be used, for example, in light communication and particularly relates to a coated optical fiber having a colored layer provided thereon.

2. Background Information

In an optical fiber to be used for light communication, it is considered preferable to provide a plastic coating (primary coating) on the outer circumference of a fiber immediately after the fiber is formed, regardless of the kind of the fiber, whether it is an optical glass fiber or a quartz glass fiber. Such a coating protects the fiber from injuries caused to the fiber surface which may occur when the fiber is formed, or, by the growth of cracks generated on a naked fiber when it is exposed to the air. For such a plastic layer, thermosetting silicon resin, ultraviolet setting resin (hereinafter referred to "UV resin"), or radiation setting resin, are some of the coatings most normally found in the art. UV resin has recently found wide acceptance.

An optical fiber having a primary coating layer of UV resin is manufactured, for example, through a process in which UV resin is continuously applied, by use of coating dyes, onto an optical fiber which is wire-drawn, by use of a wiredrawing furnace, and irradiated with ultraviolet rays to thereby harden the UV resin. One or more optical fibers coated with UV resin are further coated with a secondary coating layer such that a coated optical fiber is produced. For the purpose of discrimination, sometimes, an individual UV resin coated fiber is coated with a colored layer as a secondary coating layer. This optical fiber is referred to as a color-coated optical fiber.

Generally, a plurality of such color-coated optical fibers are put side by side, and a bundle coating is applied onto the outside of the color-coated optical fibers to thereby form a tape-like coated optical fiber.

In the case where the tape-like coated optical fibers are to be joined to each other at the time of laying a cable or the like, it is necessary to remove the bundle coating layers at the respective end portions of the respective optical fibers so as to expose the color-coated optical fibers. However, when the bundle coating layers are removed, the colored layers are often removed together with the bundle coating layers. If these colored layers are simultaneously removed, it becomes impossible to discriminate each of the coated optical fibers from one another, making the subsequent joining of the coated optical fibers extremely difficult and time consuming.

SUMMARY OF THE INVENTION

It is an object of the present invention to provide a method of manufacturing color-coated optical fibers in which joining work can be easily performed without removing the colored layers together with a bundle coating layer when the bundle coating layer is removed. That is, it is an object of the present invention to provide a method of producing a color-coated optical fiber in which a colored layer is provided on the outer circumference of a primary coating of an optical fiber while keeping the surface of the primary coating in an unhardened state to thereby increase the adhesive strength between the primary coating layer and the colored layer so that the colored layer is not removed together with a bundle coating when the bundle coating is removed.

BRIEF DESCRIPTION OF THE DRAWINGS

In the accompanying drawings, the specific components are described in fuller detail by way of the DETAILED DESCRIPTION OF THE PREFERRED EMBODIMENTS.

DETAILED DESCRIPTION OF THE INVENTION

The present invention relates to a process of keeping the surface of the primary coating layer in an unhardened state. This has been achieved by performing the process in an atmosphere in which oxygen is mixed into an inert gas, when the primary coating layer is hardened. The number of the primary coated layers may be one or more.

The quantity of oxygen to be mixed into the inert gas may be within a range of from 0.1% to 5%. If the quantity of oxygen is not more than 0.1%, it has been found that the unhardened state cannot be maintained. If the quantity of oxygen is not less than 5%, the unhardened state is defective to the point whereby the appearance is made unacceptable, resulting in undesirable reliability. When the quantity of oxygen to be mixed is selected to be within a range of from 0.5% to 2%, the unhardened state is most preferable.

Figure 1:
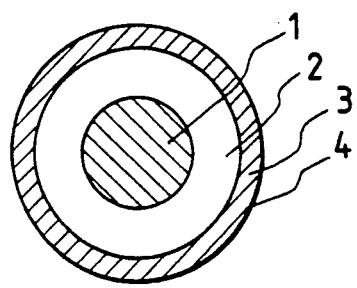
FIG. 1 is a sectional view of a color-coated optical fiber.
Figure 2:
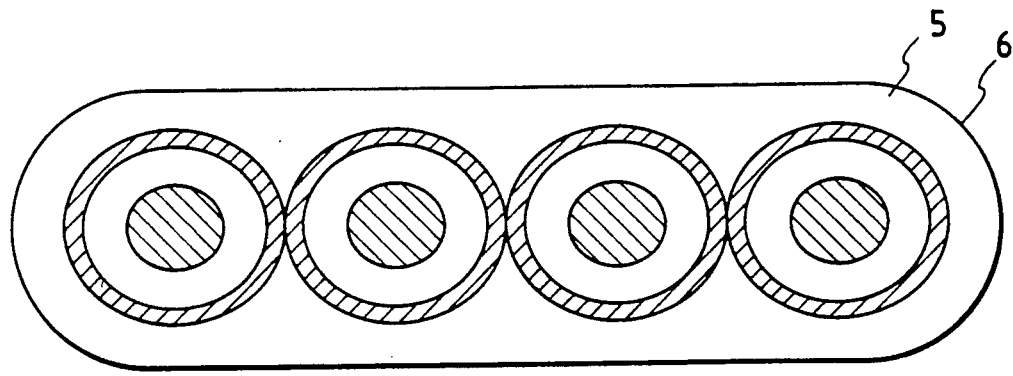
FIG. 2 is a sectional view of a tape-like coated optical fiber.

With reference to FIG. 1, a primary coating layer 2, and a secondary coating layer 3, as a colored layer were formed in various combinations. Table 1 shows a number of various color-coated optical fibers (A–F) which were manufactured by the present invention. In these examples, the primary coating layers were hardened in an atmosphere in which the quantity of oxygen to be mixed into an inert gas was variously changed. The colored layer as the secondary coating layer was provided on the outer circumference of each of the primary coated layers. Subsequently, four of each of the color-coated optical fibers, A–F, were placed side-by-side as shown in FIG. 2, and a bundle coating layer, 5, was applied on the outer circumference of the four, to thereby manufacture a tape-like coated optical fiber, 6.

TABLE 1

| Various color-coated optical fibers | | |
|---|---|---|
| Color-coated optical fiber | | |
| Color coated optical fiber | Resin of primary coating | Material of color-coating layer | Density of oxygen to be mixed into an inert gas at the time of hardening the primary coating layer |
|---|---|---|---|
| A | Ultraviolet setting urethane acrylate resin | Ultraviolet setting ink | 0.5% |
| B | Ultraviolet setting urethane acrylate resin | Ultraviolet setting ink | 1.0% |
| C | Ultraviolet setting silicon resin | Ultraviolet setting ink | 0.5% |

TABLE 1-continued

| | Various color-coated optical fibers Color-coated optical fiber | | |
|---|---|---|---|
| Color coated optical fiber | Resin of primary coating | Material of color-coating layer | Density of oxygen to be mixed into an inert gas at the time of hardening the primary coating layer |
| D | Ultraviolet setting silicon resin | Ultraviolet setting ink | 1.0% |
| E | Ultraviolet setting urethane acrylate resin | Ultraviolet setting ink | 10.0% |
| F | Ultraviolet setting urethane acrylate resin | Ultraviolet setting ink | 0% |

As an example of the problems inherent in joining fibers made by technology known to one skill in the art, a bundle coating was removed at an end portion of the tape-like coated optical fiber which had been prepared through a process in which four of the color coated optical fibers, formed in a manner similar to sample F in Table 1, wherein each had their primary coatings hardened in an atmosphere having no oxygen mixed into an inert gas. The bundle coating was formed on the outer circumference of the four color coated optical fibers as shown in FIG. 2. As a result, the colored layers were removed together with the bundle coating, so that it became difficult to discriminate the cores from each other.

As an example of one embodiment of the present invention, tape-like coated optical fibers manufactured in a manner similar to the examples A-E of Table 1, each having the primary coating layer hardened or cured in an atmosphere with oxygen mixed into an inert gas, and hence, having the colored layer formed while the surface of the primary coating layer was kept in a unhardened state, only the bundle coating could be removed. The cores could be easily discriminated from each other when joining, and therefore, the efficiency of the joining work was extremely improved. In the case of the color-coated optical fibers, E, having the primary coating layer hardened in an atmosphere with a 10% mixture of oxygen into an inert gas, the external appearance of the coated surface was defective, decreasing the value of this example as compared to the others shown in Table 1.

In the case where tape-like coated optical fibers are to be joined to each other at the time of laying a cable, it is necessary to remove the bundle coating layer at the respective end portions of the optical fibers so as to expose the color-coated optical fibers. When the bundle coating layer is removed, however, the colored layers are often removed together with the bundle coating layer.

It is an object of the present invention to provide a method to improve the adhesive strength between the primary coating layer and the colored layer as the secondary coating layer so that the colored layer is prevented from being removed together when the bundle coating layer is removed.

What is claimed is:

1. A method of manufacturing a color-coated optical fiber comprising the steps of:
   coating the outer circumference of said optical fiber with a primary coating layer wherein said primary coating is a resin coating selected from the group consisting of thermosetting resins, and radiation setting resins;
   maintaining the primary coating layer in an atmosphere of inert gas mixed with oxygen, such that the oxygen content is in the range of about 0.1% to less than 5%, wherein the primary coating layer is maintained in an unhardened state; and
   applying a secondary UV curable coating layer, which may be colored, to the outer circumference of the primary coating layer.

2. The method according to claim 1, wherein the quantity of oxygen mixed into the inert gas is within the range of about 0.5% to 2%.

* * * * *